Inventor:
Karl Oskar Hebenstreit

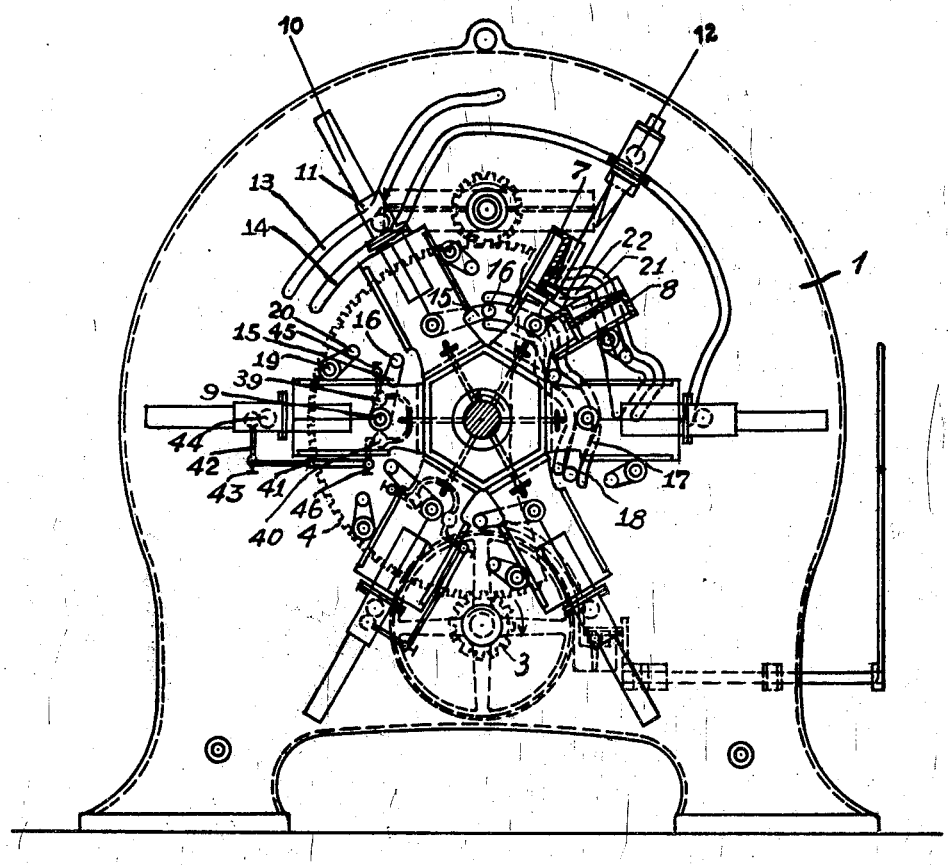

June 24, 1930.　　K. O. HEBENSTREIT　　1,766,023

BAKING MACHINE

Filed Sept. 15, 1927　　5 Sheets-Sheet 3

Inventor:
Karl Oskar Hebenstreit

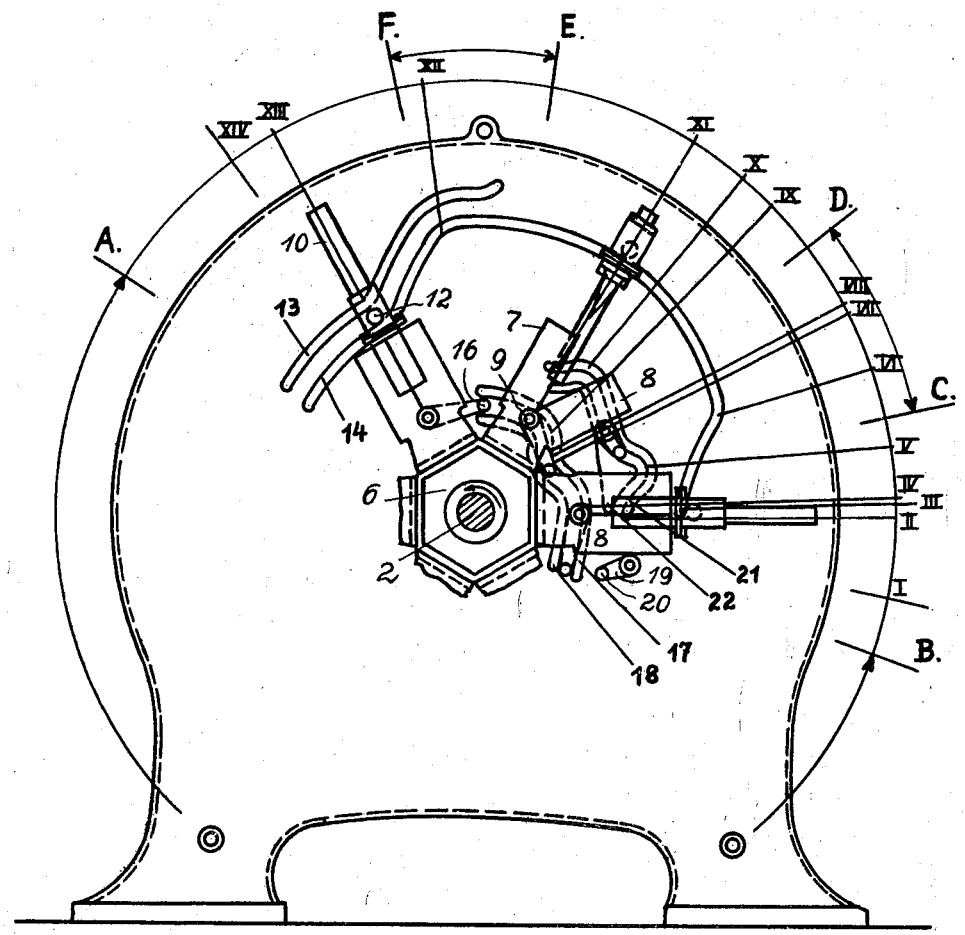
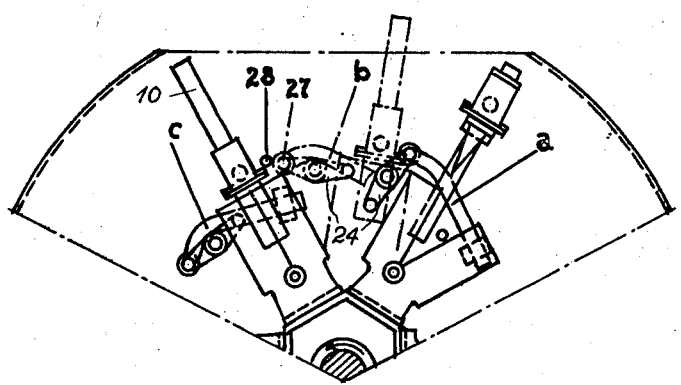

June 24, 1930. K. O. HEBENSTREIT 1,766,023
BAKING MACHINE
Filed Sept. 15, 1927 5 Sheets-Sheet 5
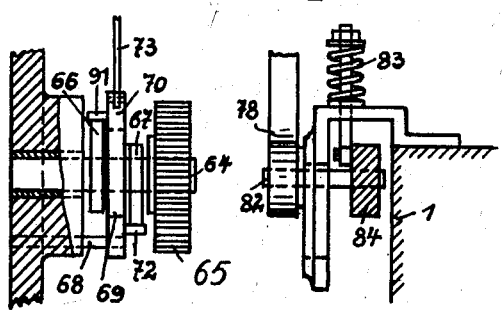
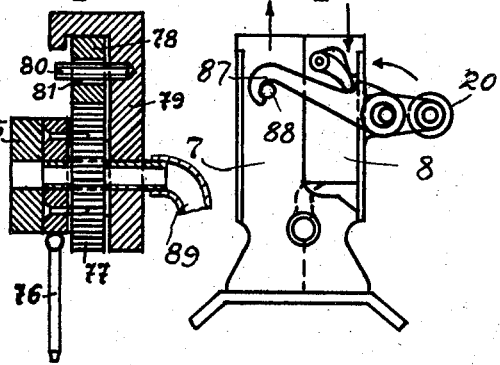
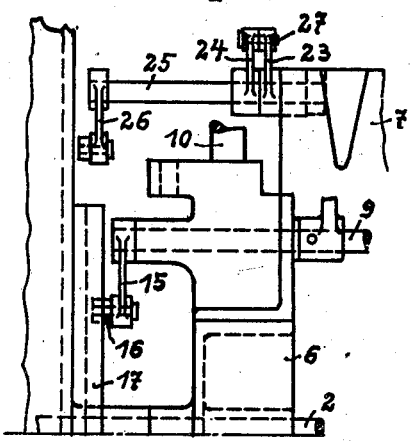
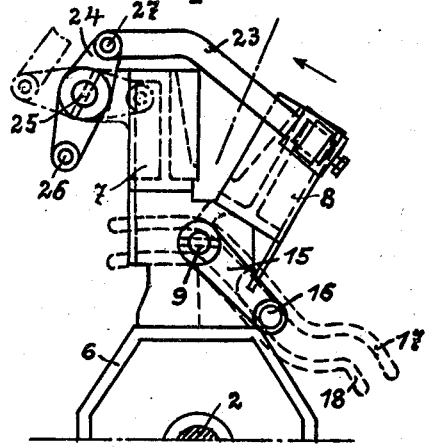
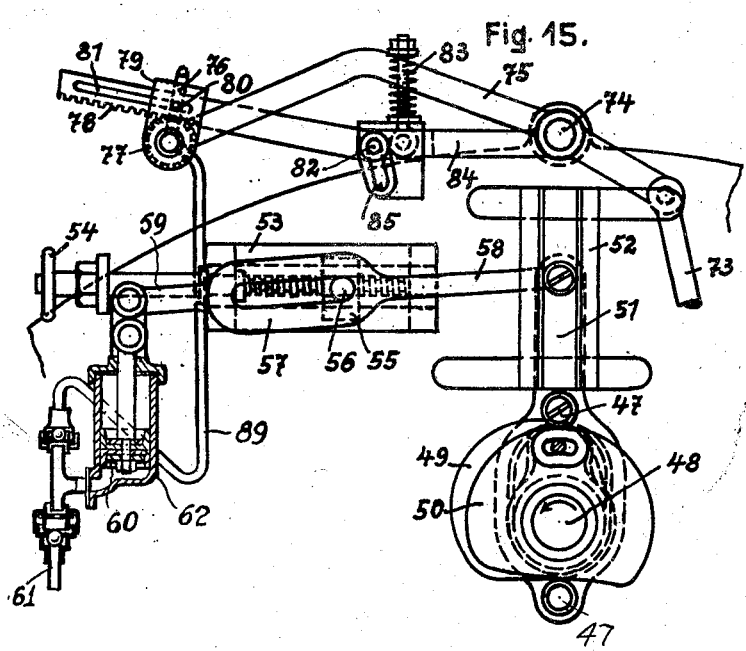
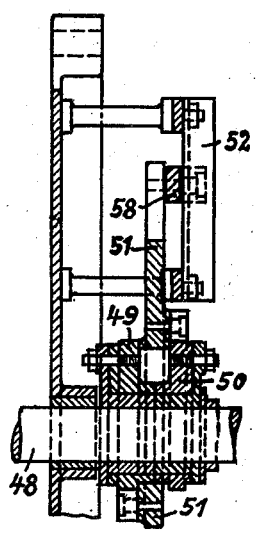
Inventor:
Karl Oskar Hebenstreit Patented June 24, 1930

1,766,023

UNITED STATES PATENT OFFICE

KARL OSKAR HEBENSTREIT, OF DRESDEN, GERMANY

BAKING MACHINE

Application filed September 15, 1927, Serial No. 219,737, and in Germany June 25, 1927.

This invention relates to a machine for baking hollow wafers, waffles, biscuits and the like, and consists in the provision of a revolving shaft to which baking moulds composed of hingedly connected parts and cores for said moulds, are secured together with heating elements, means being provided for opening and closing the moulds, inserting and withdrawing the cores, locking the mould parts together and to the cores, unlocking the same and for filling the moulds, all during one complete revolution of the shaft.

Figure 1:
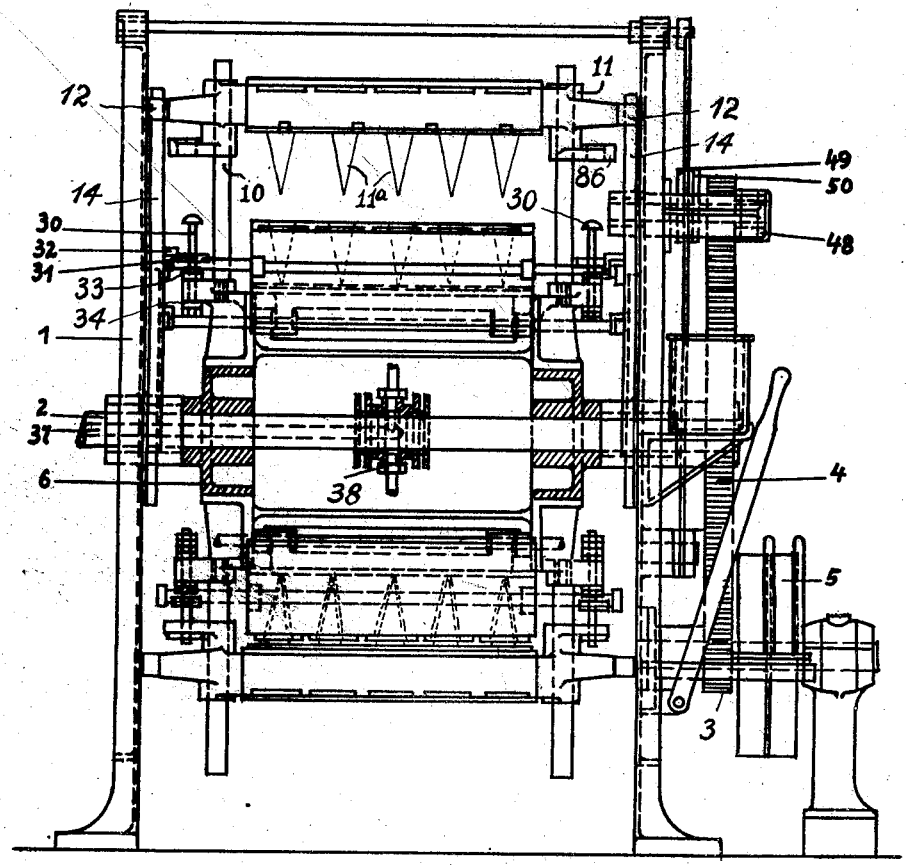
Figure 2:
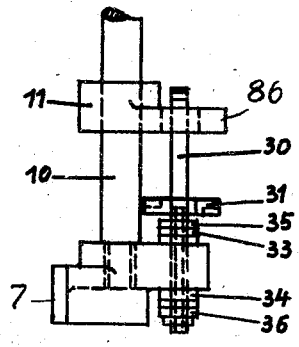
Figure 5:
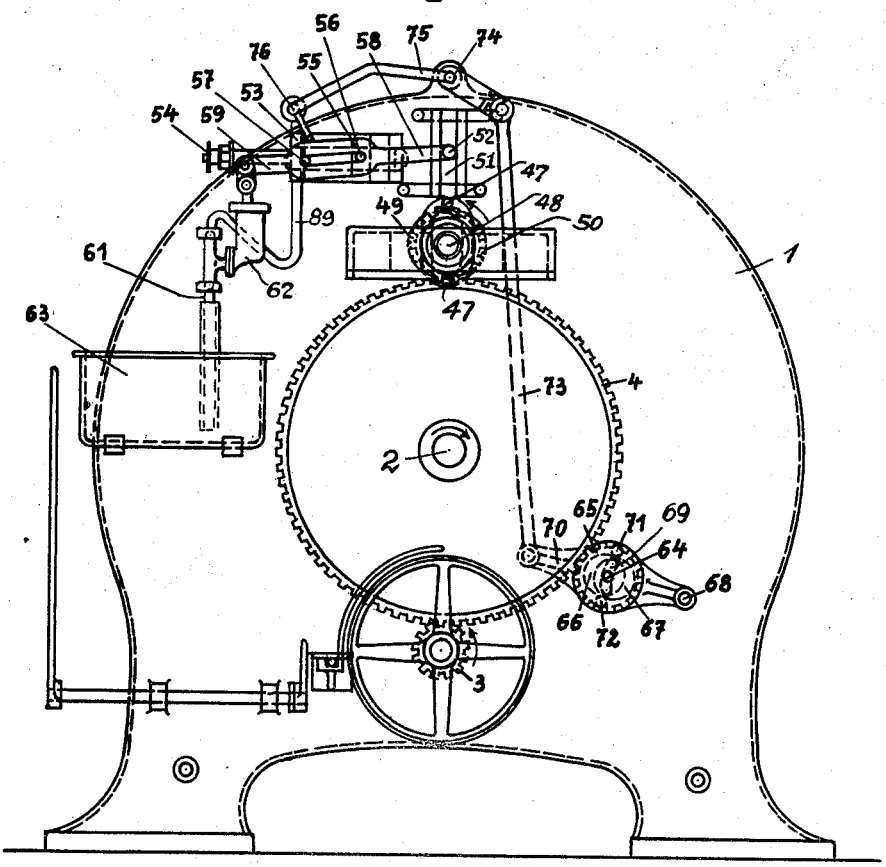
Figure 6:
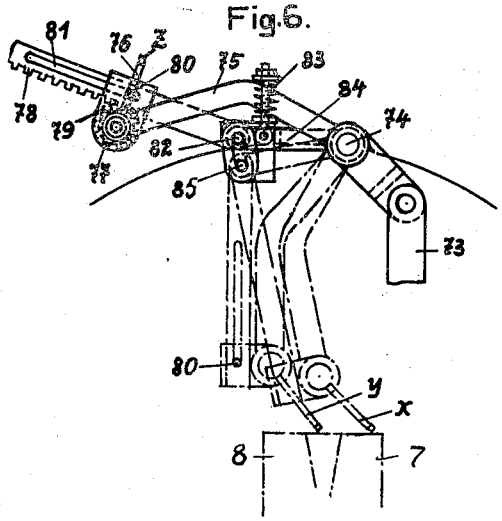

Fig. 1 of the accompanying drawings represents a vertical, axial section of the machine;

Fig. 2, a view of the locking device for the cores;

Fig. 3, a side view of the machine;

Fig. 4, a view of a modified form of locking device for the moulds;

Fig. 5, a view of the machine seen from the opposite side of Fig. 3;

Fig. 6, a view of the dough-feeding nozzle and its operating device;

Fig. 7, a side view of the machine illustrating the different stages of operation;

Fig. 8, a view illustrating the operation of the mould locking device of Fig. 4;

Fig. 9, a view of the driving gear for the dough feeding device;

Fig. 10, a detail view of the dough feeding device;

Fig. 11, a view of another detail of the dough feeding device;

Fig. 12, a side view of a modified locking device for the moulds;

Fig. 13, a view on an enlarged scale and at right angles to Fig. 4 of the mould locking device shown in the latter figure;

Fig. 14, a view at right angles to Fig. 13;

Fig. 15, a general view of the dough feeding device, and

Fig. 16, a sectional view of the cams which operate the dough pump.

The machine comprises a horizontal shaft 2 which is mounted in a frame 1 and which receives motion from a belt-pulley 5 through the medium of a pinion 3 and a gear wheel 4. The shaft carries polygonal castings 6 on the sides of which the baking moulds are mounted in a radial position relative to the shaft. Each baking mould is divided into two parts 7 and 8 the former of which is rigidly secured to the casting 6, the part 8 being hinged at 9 to the part 7 so as to allow the mould to be opened. The hinged mould part is controlled by a lever arm 15 which is fitted at its free end with a roller 16, and rails 17 and 18, carried by the frame 1, form a cam track wherein the rollers 16 are received for opening and reclosing the moulds as the latter revolve together with the shaft 2 within the machine frame. The moulds are open at the outer end for the reception of cores 11ª which are carried by means of holders 11 on radial rods 10 connected to the rigid mould part 7. The core holders are adapted to slide on the rods and they are fitted with rollers 12 which are engaged in cam tracks formed by rails 13 and 14 for raising the cores from and reinserting them into the moulds. To secure the cores within the moulds during the baking process, the rigid mould part is fitted with a turn-button 30, and the core holder with slotted arms 86 through which the turn-buttons are admitted. The turn-buttons are fitted with star wheels 31 which strike against abutments 32 on the machine frame for turning the buttons each time through 90°, one operation causing the buttons to lock and the other to unlock the core holders. Each turn-button spindle is controlled by nuts 33, 34, 35 and 36 which can be adjusted for taking up the wear of the button.

There are also means for locking the mould parts together. Such means may consist of a lever arm 19 connected to the mould part 8 and fitted with a roller 20 adapted to engage in a cam track formed by rails 21 and 22, the arm being connected to a hook 87 which it turns into and out of engagement with a button 88 on the mould part 7.

An alternative mould locking device is shown in Figs. 4, 13 and 14 and consists of an arm 23 which is connected to the mould part 8 and which turns a locking lever 24 secured to a shaft 25 mounted in the mould part 7. Another arm 26 on the shaft co-operates with abutments 28 and 29 on the machine frame for locking and unlocking the mould. The connecting point 27 between the arms 23 and 24 is turned by one abutment beyond the dead center position so as to lock the moulds. The other abutment restores the elements so as to allow the mould to be opened. Fig. 8 shows at a the open position of the mould and of the locking device, at b it shows the mould closed and the locking device positioned, while at c the locking has been effected through the medium of the abutment 28.

The mould parts and the cores are heated by gas which is led in through a duct 37 in the shaft 2. The gas first enters a distributor 38 whence pipes lead to burners 39 and 40 in the two mould parts. The supply is regulated by means of taps 45 and 46. Telescopic pipe extensions 41 lead through taps 43 and pipes 42 to burners 44 in the cores.

Dough is supplied to the moulds from a trough 63 through the medium of a suction pipe 61 and a pump 62. The piston 60 of the latter is linked to one end 59 of a double-armed lever 57, the opposite end 58 of which is pivoted to a slide 51 mounted in a guide 52. Cams 49 and 50 which are mounted on a shaft 48 and driven from the gear wheel 4, co-operate with rollers 47 on the slide 51 for reciprocating the latter and operate the pump at appropriate intervals. The pin 56 which serves as a fulcrum for the lever 57 engages in a longitudinal slot in the latter and is connected to a slide 55 held in a guide 53. This slide is controlled by a screw spindle 54 whereby it can be adjusted by hand for shifting the fulcrum of the lever and regulating the pump stroke.

The dough feeding nozzle 76 is connected to the pump by means of a flexible pipe 89 and is rotatably arranged in a holder 79 wherein it can be turned in a vertical plane. The holder is rotatably mounted at the end of a double-armed lever 75 which rocks about a pivot 74 and which is connected by a rod 73 to a lever arm 70. The latter is pivoted at 68 to the machine frame and is formed with a segmental slot 69 whereby it is guided on a shaft 64. Pins 71 and 72 on the lever 70 are engaged by cams 66 and 67 for rocking the levers and reciprocating the feeding nozzle towards and away from the moulds. The cams are mounted on the shaft 64 and are driven by means of a pinion 65 which meshes with the gear wheel 4. The holder 79 is guided on a toothed rack 78 which is pivoted at 82 and which is rocked together with the lever 75. The pivot 82 is distanced from the pivot 74 so that a displacement of the holder on the rack takes place during the rocking movement. A pinion 77 which controls the nozzle 76, meshes with the rack and causes the nozzle to turn in the holder from a substantially upright to a downwardly inclined position while it is moved bodily by the lever 75 from the raised inoperative position shown by full lines in Fig. 6 to the operative position shown by dotted lines. The pivot 82 is connected to an arm 84 which is capable of rocking about the pivot 74 and which is controlled by a spring 83. The rack 78 has a longitudinal slot 81 in which engages a pin 80 connected to the holder 79. When the nozzle reaches the position y (Fig. 6), the pin 80 is at the end of the slot 81 and prevents further displacement of the holder 79 relative to the rack. In the further movement of the lever 75, therefore, the arm 84 is rocked in opposition to the spring 83, the pivot 82 being for this purpose guided in a slot 85 in the machine frame. By this arrangement the nozzle is induced to maintain the same inclination while travelling, together with the mould, from the position y to the position x. During this movement the feeding of the dough into the mould takes place through the medium of the pump.

The action is as follows:

The moulds move in the direction shown by the arrow in Fig. 7, and the actual baking process takes place while the moulds travel from the position A to the position B. When the moulds arrive in the position I, the star wheels 31 strike against the abutments 32 and turn the buttons 30 through 90° so as to release the core holders 11. At II the locking devices which hold the mould parts together, are released, and at IV the rollers 16 are engaged in their cam tracks so as to open the mould, the opening being completed at VII. At III the rollers 12 engage the rails 14 and lift the cores out of the mould during the period III—VI. During the period C—D the wafers are removed from the mould. During the period VIII—IX the mould is reclosed, and during the period X—XI the locking device is operated for locking the parts together. During the period XI—E the feeding nozzle or nozzles occupy the position z (Fig. 6) and are then lowered to the position y whereupon they follow the mould to the position x and recharge it with dough. This takes place during the period E—F. During the period XII—XIII the cores are again lowered into the mould, and at XIV the turn-button are operated for locking the cores in position so that the baking process can recommence at A.

I claim:

1. A machine of the character described for baking hollow cakes and biscuits, comprising a frame, a revolving shaft mounted in said frame, polygonal castings mounted on the shaft, cake moulds mounted on said castings in a radial fashion, one half of each mould being rigidly secured to the casting and the other half hinged to the rigid half, cores for said moulds, holders for said cores, rods on the rigid mould halves whereon said core holders are guided, means on the rigid mould halves for locking the cores to the moulds, a dough pump mounted on the machine frame, connection between the shaft and the pump for operating the latter, closing and locking elements for the moulds carried by the rigid mould halves, heating elements for the moulds and for the cores carried by the rigid mould halves, and means for controlling the different elements so that all will be operated during one revolution of the shaft.

2. A baking machine as claimed in claim 1 wherein the means for locking the mould part together consist of a double-armed lever connected to one of the mould parts, a lug on the other mould part for engagement with said lever, and abutments on the frame whereby said lever is turned into and out of engagement with said lug.

3. A baking machine as claimed in claim 1 wherein the means for locking the cores to the moulds consist of turn-buttons carried by the moulds, star wheels controlling said turn-buttons, abutments on the frame for operating said buttons by engagement with the star wheel, and means for adjusting the position of the buttons in the moulds.

4. A baking machine according to claim 1 wherein the connection between the shaft and the dough pump comprises a lever for operating said pump, eccentrics for rocking said lever, and gear wheels transmitting motion from the shaft to the eccentrics.

5. A baking machine according to claim 1 wherein the connection between the shaft and the dough pump comprises a double-armed lever for operating said pump, eccentrics for rocking said lever, connection between the machine shaft and the eccentrics for rotating the latter, and hand-operated means for shifting the fulcrum of the lever so as to vary the stroke of the pump.

6. The baking machine claimed in claim 1 in combination with a feeding nozzle, flexible connection between the nozzle and the pump, a double-armed lever carrying the nozzle, a cam for rocking said lever so as to move the nozzle towards and away from the moulds, and gears transmitting motion from the shaft to the cam.

7. The baking machine claimed in claim 1 in connection with a feeding nozzle, flexible connection between the nozzle and the pump, a double-armed lever carrying the nozzle, a cam for rocking said lever so as to move the nozzle towards and away from the moulds, gears transmitting motion from the shaft to the cam, and means for turning the nozzle from an upright to a downwardly directed position while it moves towards the moulds.

8. The baking machine claimed in claim 1 in combination with a feeding nozzle, flexible connection between said pump and the feeding nozzle, a holder wherein the nozzle can turn from an upright into a downwardly inclined position, a double-armed lever carrying the holder pivotally at one end, connection between the shaft and the lever for rocking the latter so as to move the holder towards and away from the moulds, a pivoted rack whereon said holder is guided, said rack being arranged relative to the lever so that displacement of the holder along the rack takes place when the lever is rocked, and a pinion connected to the nozzle and meshing with the rack so as to turn the nozzle from its upright into its downwardly inclined position while it is moved towards the mould.

9. The baking machine claimed in claim 1 in combination with a feeding nozzle, flexible connection between said pump and the feeding nozzle, a holder wherein the nozzle can turn from an upright into a downwardly inclined position, a double-armed lever carrying the holder pivotally at one end, connection between the shaft and the lever for rocking the latter so as to move the holder towards and away from the moulds, a pivoted rack whereon said holder is guided, said rack being arranged relative to the lever so that displacement of the holder along the rack takes place when the lever is rocked, a pinion connected to the nozzle and meshing with the rack so as to turn the nozzle from the upright to the downwardly inclined position when it is moved towards the moulds, and means for limiting the displacement of the holder along the rack, the rack pivot being resiliently supported so as to enable the holder to follow the continued movement of the supporting lever when the displacement thereof on the rack is stopped.

KARL OSKAR HEBENSTREIT.